US010618620B2

(12) United States Patent
Matsui et al.

(10) Patent No.: US 10,618,620 B2
(45) Date of Patent: Apr. 14, 2020

(54) OUTBOARD MOTOR

(71) Applicant: YAMAHA HATSUDOKI KABUSHIKI KAISHA, Iwata-shi, Shizuoka (JP)

(72) Inventors: Takahiro Matsui, Shizuoka (JP); Makoto Morino, Shizuoka (JP)

(73) Assignee: YAMAHA HATSUDOKI KABUSHIKI KAISHA, Shizuoka (JP)

(*) Notice: Subject to any disclaimer, the term of this patent is extended or adjusted under 35 U.S.C. 154(b) by 0 days.

(21) Appl. No.: 16/026,127

(22) Filed: Jul. 3, 2018

(65) Prior Publication Data
US 2019/0031310 A1 Jan. 31, 2019

(30) Foreign Application Priority Data
Jul. 31, 2017 (JP) ................. 2017-148169

(51) Int. Cl.
B63H 20/32 (2006.01)
B63H 20/00 (2006.01)
F04D 29/28 (2006.01)
F02B 63/06 (2006.01)
F02B 61/04 (2006.01)
F04D 29/02 (2006.01)
F02M 35/10 (2006.01)
F16F 15/30 (2006.01)
H02K 7/18 (2006.01)
H02K 9/06 (2006.01)
F04D 29/44 (2006.01)
F04D 29/42 (2006.01)
F01P 3/20 (2006.01)
F01P 5/02 (2006.01)
F02B 63/04 (2006.01)
F02P 1/02 (2006.01)
H02K 5/20 (2006.01)

(52) U.S. Cl.
CPC .............. *B63H 20/00* (2013.01); *F01P 3/202* (2013.01); *F01P 5/02* (2013.01); *F02B 61/045* (2013.01); *F02B 63/06* (2013.01); *F02M 35/10091* (2013.01); *F04D 29/023* (2013.01); *F04D 29/282* (2013.01); *F04D 29/4226* (2013.01); *F04D 29/441* (2013.01); *F16F 15/30* (2013.01); *H02K 7/1815* (2013.01); *H02K 9/06* (2013.01); *B63H 20/32* (2013.01); *B63H 2020/003* (2013.01); *F02B 63/042* (2013.01); *F02P 1/02* (2013.01); *H02K 5/20* (2013.01)

(58) Field of Classification Search
CPC .. B63H 20/32; F02M 35/167; F02M 35/1227; H02K 9/06; F04D 29/4226; F04D 29/4233; F04D 29/424; F04D 29/4246; F04D 29/4253
See application file for complete search history.

(56) References Cited

U.S. PATENT DOCUMENTS

| 2004/0149241 A1 | 8/2004 | Shomura et al. |
| 2014/0076268 A1* | 3/2014 | Furuya ................... F02F 1/002 123/197.4 |
| 2017/0183993 A1* | 6/2017 | Ishihara ............... B63H 20/001 |

FOREIGN PATENT DOCUMENTS

JP 2004-239156 A 8/2004

* cited by examiner

Primary Examiner — Andrew Polay
(74) Attorney, Agent, or Firm — Keating & Bennett, LLP

(57) ABSTRACT

An outboard motor includes an engine including a crankshaft, a generator including a rotor that rotates together with the rotation of the crankshaft and a stator in which a coil is wound so as to face the rotor, and a fan including a blade disposed coaxially with the rotor, provided separately from the rotor, and that rotates together with the rotation of the rotor.

14 Claims, 6 Drawing Sheets

FLOW OF AIR (WIND)

OUTBOARD MOTOR

CROSS REFERENCE TO RELATED APPLICATIONS

This application claims the benefit of priority to Japanese Patent Application No. 2017-148169 filed on Jul. 31, 2017. The entire contents of this application are hereby incorporated herein by reference.

BACKGROUND OF THE INVENTION

1. Field of the Invention

The present invention relates to an outboard motor, and more particularly, it relates to an outboard motor including an engine and a power generator.

2. Description of the Related Art

An outboard motor including an engine and a power generator is known in general. Such an outboard motor is disclosed in Japanese Patent Laid-Open No. 2004-239156, for example.

Japanese Patent Laid-Open No. 2004-239156 discloses an outboard motor including a vertical multi-cylinder engine including a crankshaft that protrudes upward and a flywheel magneto provided on a protrusion of the crankshaft and including a flywheel and a power generation function. The flywheel magneto of the outboard motor includes a magneto rotor including a magnet fixed to the inner peripheral side and a magneto stator including a stator coil concentrically disposed on the inner peripheral side of the magneto rotor. The magneto rotor is provided on the flywheel. On the upper surface of the flywheel, a plurality of fins that constitute a ventilation fan that ventilates an engine compartment are integral and unitary with each other.

In the outboard motor disclosed in Japanese Patent Laid-Open No. 2004-239156, when the shape of the fins (blade) is changed, for example, it is necessary to change the entire flywheel, and thus it is not easy to increase the variety of fin shapes, for example. It is preferable to change the shape, material, etc. of the blade according to the shape of the outboard motor, the required amount of wind, the direction of the blowing air, etc., and it is particularly required to increase the variety of fin shapes, for example. In addition, in the outboard motor disclosed in Japanese Patent Laid-Open No. 2004-239156, it is disadvantageously necessary to replace the entire flywheel including not only the fins but also other components when the fins (blade) are replaced.

SUMMARY OF THE INVENTION

Preferred embodiments of the present invention provide outboard motors in which it is easy to increase the variety of blade shapes, for example, and it is not necessary to replace other components when a blade is replaced.

An outboard motor according to a preferred embodiment of the present invention includes an engine including a crankshaft, a generator including a rotor that rotates together with the rotation of the crankshaft and a stator in which a coil is wound so as to face the rotor, and a fan including a blade disposed coaxially with the rotor, provided separately from the rotor, and that rotates together with the rotation of the rotor.

In an outboard motor according to a preferred embodiment of the present invention, the fan includes the blade disposed coaxially with the rotor of the generator, provided separately from the rotor, and that rotates together with the rotation of the rotor. Accordingly, the blade is provided separately from the rotor such that the shape and/or material of only the blade are easily changed, and thus it is easy to increase the variety of blade shapes, for example. Furthermore, it is easy to remove only the blade from the rotor and replace the same with another blade, and thus it is not necessary to replace other components when the blade is replaced. Consequently, an outboard motor is provided in which it is easy to increase the variety of blade shapes, for example, and it is not necessary to replace other components when the blade is replaced.

In an outboard motor according to a preferred embodiment of the present invention, the blade that rotates together with the rotation of the rotor is disposed coaxially with the rotor. Accordingly, unlike the case where the blade is disposed on a different axis from the rotor, it is not necessary to provide a drive force generator that rotates the blade in the fan and provide a mechanism that transmits a rotational force of the rotor to the blade. Consequently, blowing air with the fan is achieved with a simple structure, and an increase in the size of a mechanism to blow the air is significantly reduced or prevented. Furthermore, the blade is disposed coaxially with the rotor of the generator such that it is easy to dispose the blade in the vicinity of the stator of the generator. Thus, the coil of the stator is efficiently cooled by the air blown by the fan (blade). Therefore, even when a high current is generated in the generator such that the amount of heat generated in the coil of the stator is increased, the heat of the coil of the stator is efficiently released.

In an outboard motor according to a preferred embodiment of the present invention, the blade preferably includes an annular first plate member and a plurality of fins that extend downward from the first plate member and are integral and unitary with the first plate member. Accordingly, upwardly flowing air generated by the plurality of fins that extend downward from the first plate member is at least partially guided laterally (laterally of the blade) by the annular first plate member. Consequently, when the fan includes an air guide that surrounds the lateral side of the blade, for example, the air is reliably guided by the air guide.

In this case, the plurality of fins preferably extend in a radial direction and are arcuately curved in a planar view. Accordingly, a large amount of air is caught by the plurality of fins arcuately curved in the planar view when the blade rotates, and thus the amount of air generated by the blade is increased. Consequently, even when a high current is generated in the generator such that the amount of heat generated in the coil of the stator is increased, the heat of the coil of the stator is more efficiently released.

In an outboard motor according to a preferred embodiment of the present invention, the fan preferably further includes a first air guide including a floor and a wall that extends upward from the floor and that surrounds fins on the blade from a lateral side, and an upper surface of the floor is preferably disposed at a same or substantially a same height as a lower end of the blade. Accordingly, the height of the wall from the upper surface of the floor to the upper end of the wall is reduced as compared with the case where the upper surface of the floor is disposed below the lower end of the blade. Consequently, the flow passage cross-sectional area of a wind passage (air guide passage) is easily reduced due to the wall, the height of which is small, and thus the speed (wind speed) of the guided wind is increased. Therefore, the heat of the coil of the stator is more efficiently released due to the high speed wind, for example.

In this case, an outboard motor according to a preferred embodiment of the present invention preferably further includes a cowling including an engine compartment in which the engine is housed, the fan preferably further includes a lid-shaped second air guide that covers the first air guide from above between the cowling and the blade, and an upper surface of the blade that faces the lid-shaped second air guide is preferably flat. Accordingly, it is easy to dispose the second air guide in the vicinity of the flat upper surface of the blade, and thus the flow passage cross-sectional area of the passage (air guide passage) of the wind guided by the floor and the wall of the first air guide and the second air guide is reduced. Consequently, the wind speed in the air guide passage is further increased, and thus the heat of the coil of the stator is still more efficiently released due to the wind.

In a structure in which the upper surface of the blade is flat or substantially flat, an air guide passage through which wind flows laterally from the blade along an outer periphery of the blade is preferably provided at a location between the first air guide and the second air guide, which faces the outer periphery of the blade. Accordingly, the speed of the wind guided in the air guide passage is increased, and thus the wind is reliably and quickly guided in the air guide passage.

In a structure in which the air guide passage is provided, a width of the air guide passage preferably gradually increases in a rotation direction of the blade. Accordingly, the air guide passage is structured such that the amount of guided wind gradually increases in the rotation direction, and thus the wind continues to be supplied from the blade to the air guide passage in the rotation direction such that a reduction in the wind speed in the air guide passage is reliably significantly reduced or prevented.

In a structure in which the air guide passage is provided, the first air guide preferably includes an inclined portion that guides the wind upward along the outer periphery through the air guide passage. Accordingly, the inclined portion guides the wind along the outer periphery upward such that accumulation of the wind warmed by the coil of the stator in the vicinity of the stator is significantly reduced or prevented. Furthermore, when there is a mechanism that discharges the wind to the outside of the outboard motor, for example, above the inclined portion, the wind is guided to the mechanism such that the warmed wind is reliably discharged to the outside of the outboard motor, for example.

An outboard motor according to a preferred embodiment of the present invention preferably further includes an air intake including an air inlet through which air is to be supplied to the engine and a cowling including an engine compartment in which the engine is housed and into which air is supplied from a side of the engine opposite to the crankshaft, and the air inlet, the fan, and the generator are preferably disposed adjacent to a side of the engine on which the crankshaft is provided. Accordingly, unlike the case where the air inlet is disposed on the side opposite to the crankshaft, to which external air is supplied, suction of a large amount of air into the air inlet is significantly reduced or prevented according to the structure of the present preferred embodiment of the present invention. Consequently, with this structure, a reduction in the amount of wind that flows toward the fan is significantly reduced or prevented, and thus the heat of the coil of the stator is efficiently and reliably released.

In an outboard motor according to a preferred embodiment of the present invention, the blade is preferably made of resin, and the rotor is preferably made of metal. Accordingly, the weight of the blade is easily reduced while the mechanical strength and heat resistance of the rotor are enhanced due to the rotor being made of metal. Consequently, an increase in a drive force to drive the fan is significantly reduced or prevented due to the blade being reduced in weight.

In an outboard motor according to a preferred embodiment of the present invention, the blade preferably includes an annular first plate member, a plurality of fins that extend downward from the first plate member, and an annular second plate member disposed on a side opposite to the first plate member, which connects the plurality of fins, fixed to the rotor. Accordingly, the fins are sandwiched between the first plate member and the second plate member such that the rigidity of the blade is improved, and thus even when the blade is rotated at a high speed in order to generate a high current, occurrence of failures such as breakage of the blade is prevented.

In a structure in which the blade includes the plurality of fins, the rotor is preferably positioned so as to cover the stator from above, a plurality of holes that communicate a lower space where the stator is disposed with an upper space where the fan is disposed are preferably provided in a portion of the rotor corresponding to the stator, the plurality of holes and the plurality of fins are preferably provided at equal or substantially equal angular intervals, and the plurality of holes are preferably equal in number to the plurality of fins. Accordingly, the plurality of holes, which are equal in number to the plurality of fins, correspond to the plurality of fins, respectively, and thus wind that flows upward through the holes is reliably generated by the blade. In addition, the plurality of holes and the plurality of fins are provided at equal or substantially equal angular intervals such that wind that flows upward through the holes is stably generated.

The above and other elements, features, steps, characteristics and advantages of preferred embodiments of the present invention will become more apparent from the following detailed description of the preferred embodiments with reference to the attached drawings.

DETAILED DESCRIPTION OF THE PREFERRED EMBODIMENTS

Preferred embodiments of the present invention are hereinafter described with reference to the drawings.

The structure of an outboard motor 1 according to preferred embodiments of the present invention is now described with reference to FIGS. 1 to 10. In the figures, arrow FWD represents the forward movement direction (front side) of a vessel body 100 on which the outboard motor 1 is provided, and arrow BWD represents the reverse movement direction (rear side) of the vessel body 100. In the figures, both arrow FWD and arrow BWD are arbitrary directions in a horizontal direction. In addition, an upward-downward direction perpendicular to arrow FWD and arrow BWD (horizontal direction) corresponds to a direction Z, an upper side corresponds to a direction Z1, and a lower side corresponds to a direction Z2.

Figure 1:
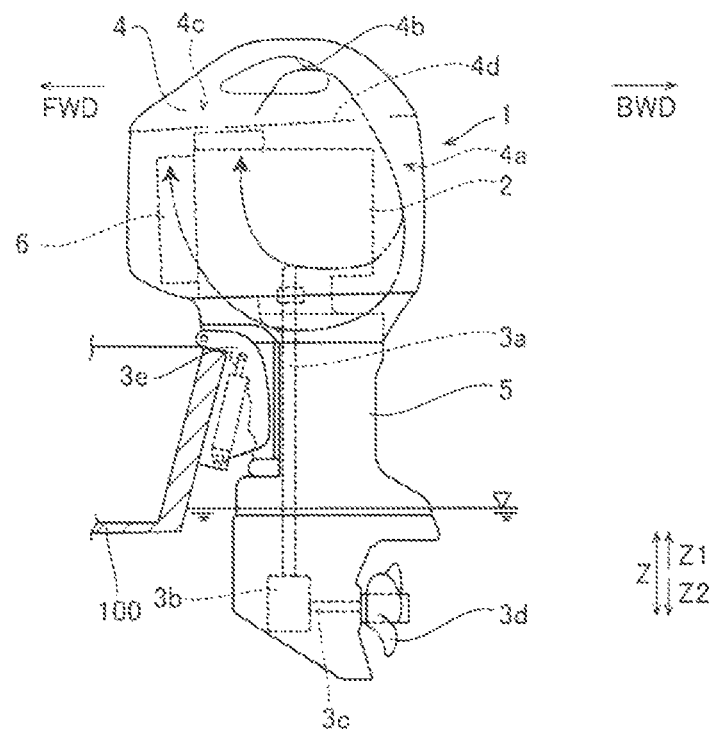
FIG. 1 is a side elevational view showing an outboard motor and a portion of a vessel body according to a preferred embodiment of the present invention.

As shown in FIG. 1, the outboard motor 1 includes a large engine 2, a drive shaft 3a that rotates due to a drive force of the engine 2 and that extends in a vertical direction (direction Z), a forward/reverse movement switch 3b connected to the lower end of the drive shaft 3a, a propeller shaft 3c connected to the forward/reverse movement switch 3b and that extends in the horizontal direction, and a propeller 3d attached to the rear end of the propeller shaft 3c. The engine 2 is housed in an engine compartment 4a in a cowling 4.

In the cowling 4, air (fresh air) is taken into an air intake chamber 4c above the engine compartment 4a from the outside of the outboard motor 1 via a vent hole 4b provided in its side portion. The air taken into the air intake chamber 4c is provided to the engine compartment 4a from a rear portion of the engine 2 opposite to a crankshaft 24. The air in the engine compartment 4a then flows downward. Thereafter, a portion of the air passes through a side surface of the engine 2, for example, and is supplied to the vicinity of a generator 7 described below. Another portion of the air passes through a lower portion of the engine 2, for example, and is supplied to an air inlet 6a of an air intake 6 described below. The engine compartment 4a and the air intake chamber 4c of the cowling 4 are partitioned by a cowling inner partition 4d.

The drive shaft 3a, the forward/reverse movement switch 3b, and the propeller shaft 3c are housed in a case 5 disposed below the cowling 4. The outboard motor 1 is attached to the reverse movement direction (BWD) side of the vessel body 100 via a clamp bracket 3e. The clamp bracket 3e supports the outboard motor 1 such that the outboard motor 1 is swingable in the upward-downward direction with respect to the vessel body 100. The propeller 3d is rotated due to the drive force of the engine 2, and the rotation direction of the propeller 3d is switched by the forward/reverse movement switch 3b such that the vessel body 100 is propelled in the forward movement direction (FWD) or the reverse movement direction (BWD).

Figure 2:
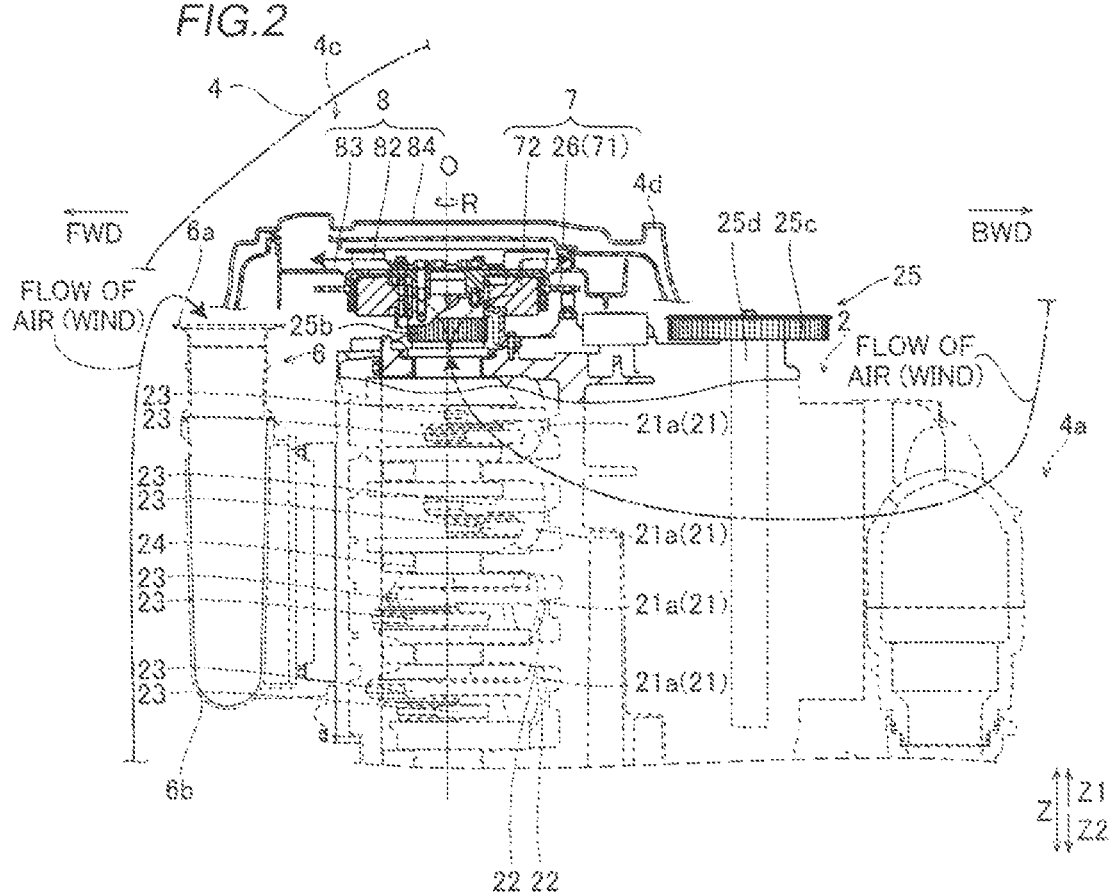
FIG. 2 is a sectional view schematically showing an outboard motor according to a preferred embodiment of the present invention.
Figure 3:
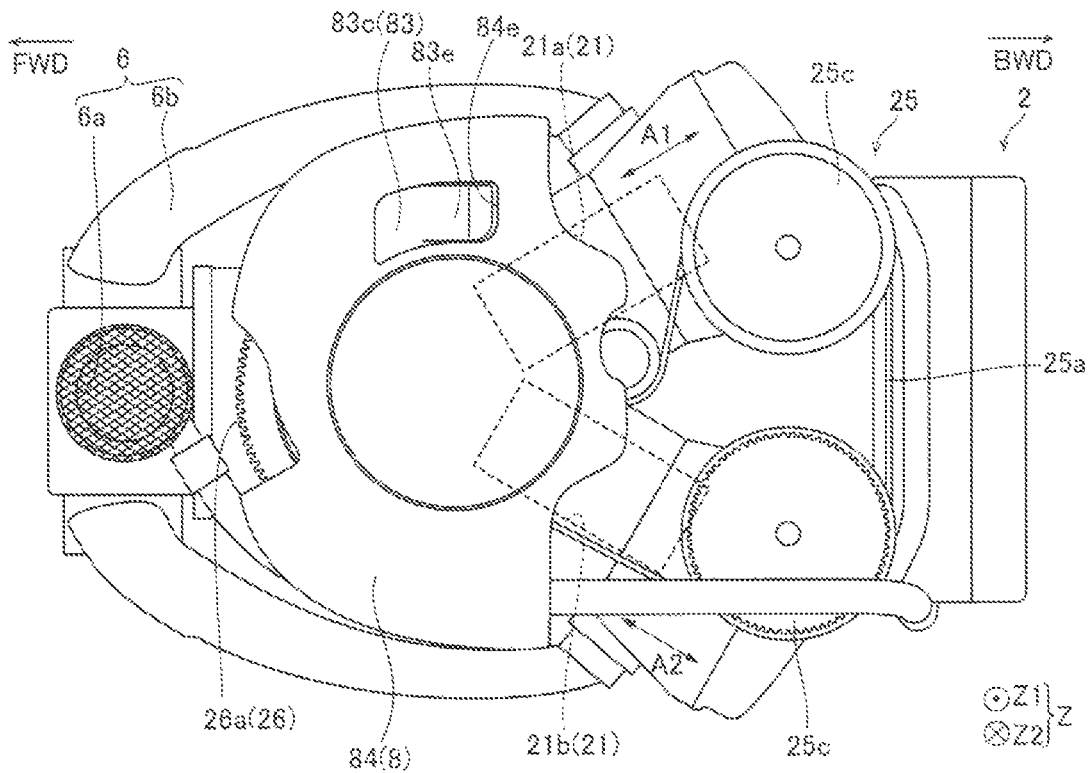
FIG. 3 is a top view showing an engine of an outboard motor according to a preferred embodiment of the present invention.

As shown in FIGS. 2 and 3, the engine 2 is preferably a V-shaped eight-cylinder engine including eight cylinders 21, for example. Specifically, in the engine 2, four cylinders 21a that extend in a horizontal direction A1 perpendicular to the upward-downward direction and four cylinders 21b that extend in a horizontal direction A2 are disposed in a V shape in a planar view, as viewed in the upward-downward direction, as shown in FIG. 3. As shown in FIG. 2, the four cylinders 21a that extend in the direction A1 and the four cylinders 21b that extend in the direction A2 are aligned in the upward-downward direction.

Each of the cylinders 21a includes a piston 22 that reciprocates in the direction A1, and each of the cylinders 21b includes a piston 22 that reciprocates in the direction A2. The pistons 22 are connected to the crankshaft 24 that extends in the upward-downward direction (direction Z) via connecting rods 23. The reciprocating movement of the pistons 22 in the horizontal direction is converted into rotational movement about a rotation axis O by the connecting rods 23 and the crankshaft 24. In the engine 2 according to preferred embodiments of the present invention, it is possible to rotate the crankshaft 24 in a rotation direction R (see FIG. 4) up to about 6000 rpm, for example.

The lower end of the crankshaft 24 is connected to the drive shaft 3a (see FIG. 1), and an upper portion of the crankshaft 24 protrudes upward from the upper surface of the engine 2. The crankshaft 24 is disposed in a front portion of the engine 2. That is, the crankshaft 24 is disposed forward of each of the cylinders 21 of the engine 2.

The engine 2 further includes a timing mechanism 25 disposed on the upper surface of the engine 2 and that transmits power to a camshaft 27. The timing mechanism 25 includes a timing belt 25a (see FIG. 3), a crankshaft pulley 25b connected to the crankshaft 24, and a pair of camshaft pulleys 25c (see FIG. 3) connected to the camshaft 27. The crankshaft pulley 25b is provided in the vicinity of the upper end of the crankshaft 24 that protrudes from the upper surface of the engine 2. The crankshaft pulley 25b meshes with the timing belt 25a to transmit rotational power of the crankshaft 24 to the timing belt 25a. As shown in FIG. 3, the pair of camshaft pulleys 25c mesh with the timing belt 25a to transmit power to corresponding camshafts 25d, respectively. Thus, combustion chambers (not shown) of the cylinders 21 are opened and closed.

As shown in FIG. 2, the engine 2 includes the air intake 6 that supplies air to the combustion chambers of the cylinders 21. The air intake 6 includes the air inlet 6a through which air is taken in and a distributor 6b that purifies the air taken in through the air inlet 6a and distributes the air to each of the cylinders 21a and 21b. The air inlet 6a is disposed forward (the side on which the crankshaft 24 is provided) of the engine 2. The air inlet 6a opens upward in an upper portion of the engine compartment 4a. Thus, water that enters the engine compartment 4a of the cowling 4 is prevented from being suctioned into the cylinders 21 of the engine 2 via the air inlet 6a.

Figure 7:
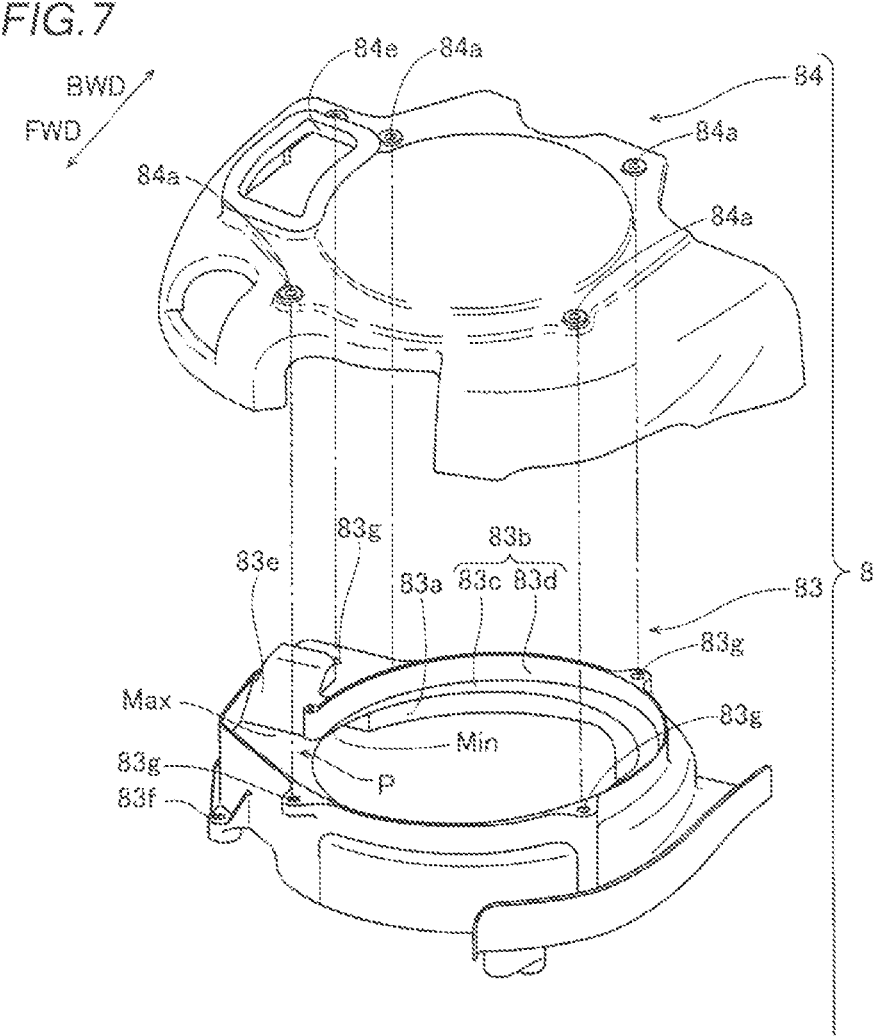
FIG. 7 is an exploded perspective view showing a rotor, a blade, a first air guide, and a second air guide of an outboard motor according to a preferred embodiment of the present invention.

A flywheel 26 made of metal is fixed to the upper end of the crankshaft 24 by fasteners B, for example. The flywheel 26 rotates in the rotation direction R about the rotation axis O as the crankshaft 24 rotates. The flywheel 26 stabilizes the rotation of the crankshaft 24. A ring gear 26a is fitted to the outer periphery of the flywheel 26. When a starter motor (not shown) starts the engine 2, a gear (not shown) of the starter motor meshes with the ring gear 26a such that the crankshaft 24 is rotated, and the engine 2 is started. As shown in FIG. 7, a plurality of fastener insertion holes 26b used to fix the flywheel 26 to the crankshaft 24 are provided in the upper surface of the flywheel 26.

Figure 5:
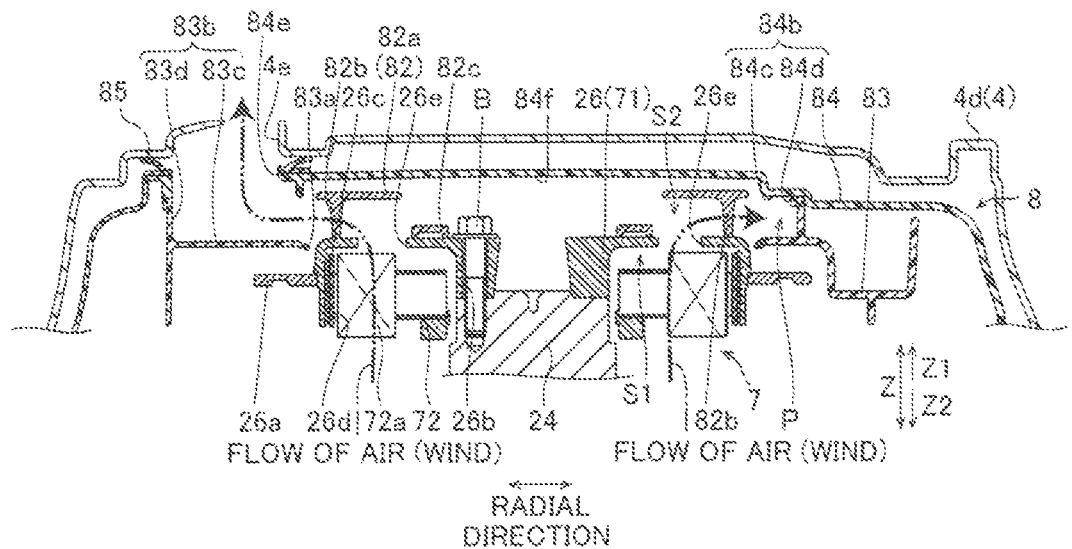
FIG. 5 is a sectional view showing a power generator and a fan of an outboard motor according to a preferred embodiment of the present invention.
Figure 6:
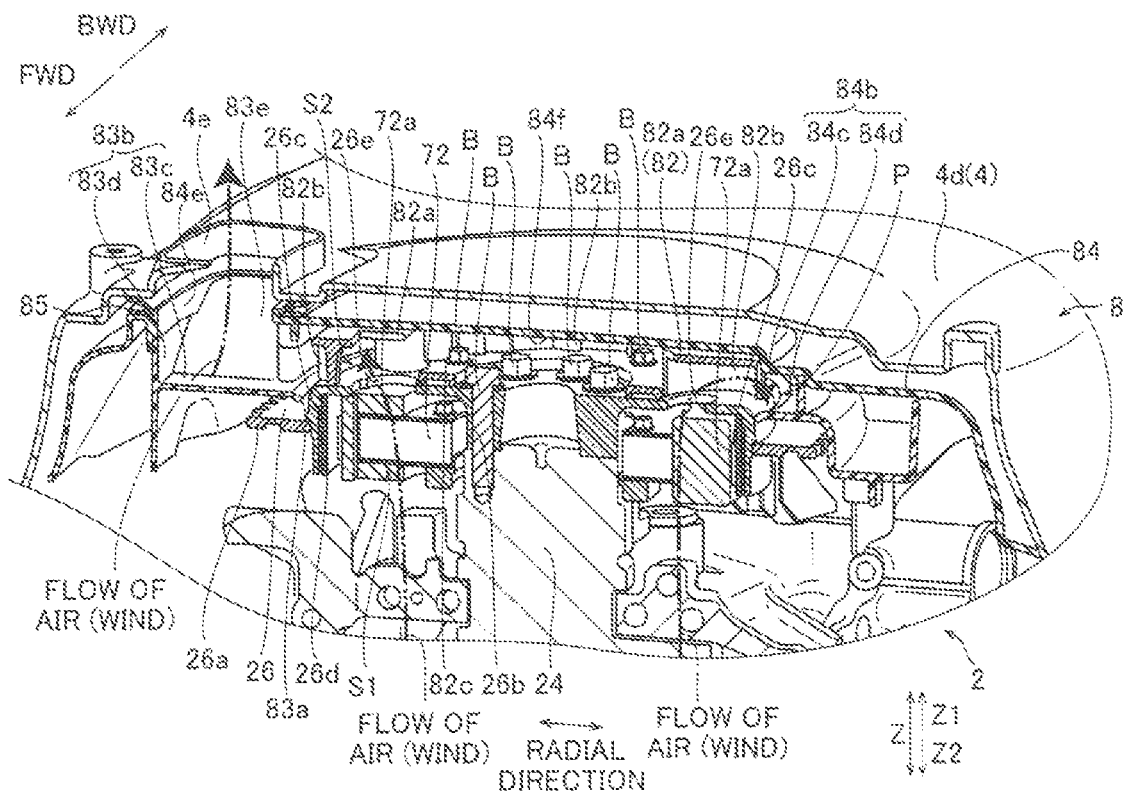
FIG. 6 is a sectional perspective view showing a power generator and a fan of an outboard motor according to a preferred embodiment of the present invention.

The outboard motor 1 further includes the generator 7 that supplies electric power to a device (not shown) on the vessel body 100. As shown in FIG. 2, the generator 7 is disposed adjacent to a front portion (the side on which the crankshaft 24 is provided) of the engine 2. As shown in FIGS. 5 and 6, the generator 7 includes a rotatable rotor 71 and a stator 72 fixed to the engine 2. The rotor 71 includes a plurality of magnets 26c attached to the flywheel 26. The plurality of magnets 26c are mounted at equal or substantially equal angular intervals on the inner peripheral surface of a circumferential wall 26d that protrudes downward from the lower surface of the flywheel 26. In other words, the flywheel 26 also defines and functions as the rotor 71. Consequently, the rotor 71 rotates in the rotation direction R about the rotation axis O as the crankshaft 24 rotates. Furthermore, the flywheel 26 is provided at the upper end of the crankshaft 24 such that the rotor 71 is mounted above the crankshaft pulley 25b, as shown in FIG. 2.

As shown in FIGS. 5 and 6, the stator 72 includes a plurality of coils 72a concentrically disposed at equal angular intervals. The plurality of coils 72a are disposed on the upper surface of the engine 2 (see FIG. 2). The plurality of coils 72a are covered from above by the flywheel 26 (rotor 71), and are wound so as to face, in a radial direction, a plurality of magnets 26c (rotor 71) circumferentially disposed.

As shown in FIG. 7, the flywheel 26 (rotor 71) includes a plurality of (twelve, for example) holes 26e that penetrate in the upward-downward direction. The plurality of holes 26e are concentrically provided at equal or substantially equal angular (for example, about 30 degrees) intervals. As shown in FIGS. 5 and 6, the plurality of holes 26e communicate a lower space S1, where the plurality of coils 72a of the stator 72 below the flywheel 26 are disposed, with an upper space S2 above the flywheel 26.

When the rotor 71 is rotated at a high rotational speed of about 6000 rpm, for example, the magnitude of an induced current generated in the coils 72a increases. Consequently, a high current is generated in the generator 7. At this time, the amount of heat generated due to the generated power increases in the coils 72a of the stator 72, and thus it is necessary to take measures to cool resin coatings (not shown) that insulate and cover the coils 72a of the stator 72.

Therefore, according to a preferred embodiment of the present invention, the outboard motor 1 further includes a fan 8 including a blade 82 that generates wind and first and second air guides 83 and 84 that guide the generated wind, as shown in FIG. 7. As shown in FIG. 2, the fan 8 is preferably a so-called sirocco fan, for example, and is disposed adjacent to the front portion (the side on which the crankshaft 24 is provided) of the engine 2. The blade 82 is provided separately from the flywheel 26 (rotor 71). The blade 82 is disposed coaxially (on the rotation axis O) with the flywheel 26 (rotor 71) and rotates in the rotation direction R about the rotation axis O as the rotor (crankshaft 24) rotates. Each of the blade 82, the first air guide 83, and the second air guide 84 is preferably made of a heat-resistant resin.

The blade 82 includes a first plate member 82a that is annular in the planar view, a plurality of (twelve, for example) fins 82b, and a second plate member 82c that is annular in the planar view. The annular first plate member 82a, the plurality of fins 82b, and the annular second plate member 82c are integral and unitary with each other, and are disposed in this order from the upper side to the lower side.

Figure 4:
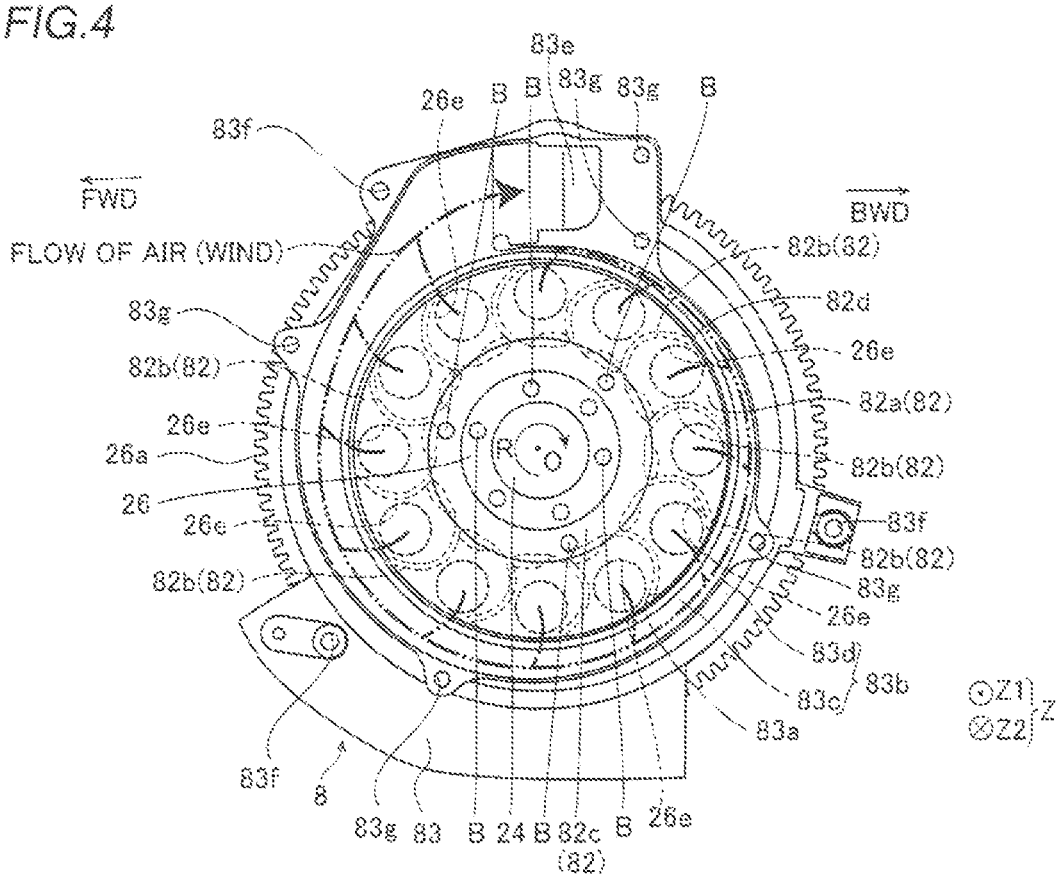
FIG. 4 is a top view showing a power generator and a fan, from which a second air guide has been removed, of an outboard motor according to a preferred embodiment of the present invention.
Figure 8:
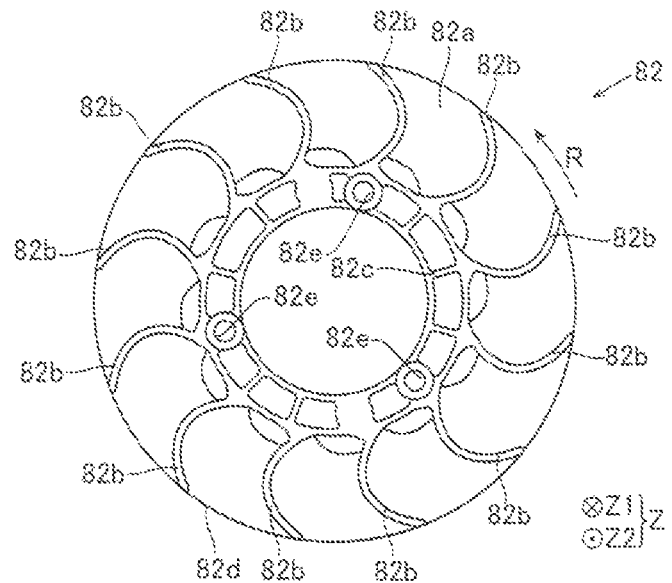
FIG. 8 is a bottom view showing a blade of a fan of an outboard motor according to a preferred embodiment of the present invention.

The annular first plate member 82a covers all of the plurality of fins 82b from above. The upper surface (surface on a Z1 side) of the first plate member 82a is flat or substantially flat. In other words, the plurality of fins 82b that extend downward from the first plate member 82a are provided at equal or substantially equal angular (about 30 degrees, for example) intervals. As shown in FIGS. 4 and 8, the plurality of fins 82b are preferably equal in number (for example, twelve) to the plurality of holes 26e. The plurality of fins 82b are preferably provided at an interval larger than the diameter of each of the plurality of holes 26e.

The fins 82b extend in the radial direction from the inner circumferential side of the first plate member 82a to the outer circumferential side of the first plate member 82a, and are semi-arcuately curved in the planar view. Specifically, the fins 82b are semi-arcuately curved such that central portions thereof in the radial direction (see FIG. 8) bulge in a direction opposite to the rotation direction R. The annular second plate member 82c is located so as to connect only radially inner (the side on which the crankshaft 24 is provided) ends of the plurality of fins 82b, and is not located in portions other than the radially inner ends.

Consequently, when the blade 82 of the fan 8 rotates in the rotation direction R together with the rotation of the rotor 71 (crankshaft 24), the flow of air (wind) from the lower side to the upper side is generated, as shown in FIGS. 5 and 6. That is, the air in the lower space S1, where the coils 72a of the stator 72 are disposed, flows upward via the holes 26e to the upper space S2 where the blade 82 is disposed. Due to the generated wind, the coils 72a of the stator 72 are air-cooled such that an increase in the temperature of the coils 72a is significantly reduced or prevented. The wind (warm air) warmed by cooling the coils 72a flows laterally (radially outward, in a direction away from the crankshaft 24) from the upper side due to the plurality of fins 82b and the annular first plate member 82a that covers all of the plurality of fins 82b from above, and is guided to the outer periphery 82d of the blade 82.

As shown in FIG. 8, fastener insertion holes 82e are provided in the annular second plate member 82c. The fasteners B (see FIG. 4) inserted into the fastener insertion holes 82e are screwed into screw holes 26f (see FIG. 7) provided in the upper surface of the flywheel 26 such that the blade 82 is fixed to the flywheel 26 (rotor 71). It is possible to remove the blade 82 from the flywheel 26 (rotor 71) simply by unscrewing the fasteners B.

Figure 9:
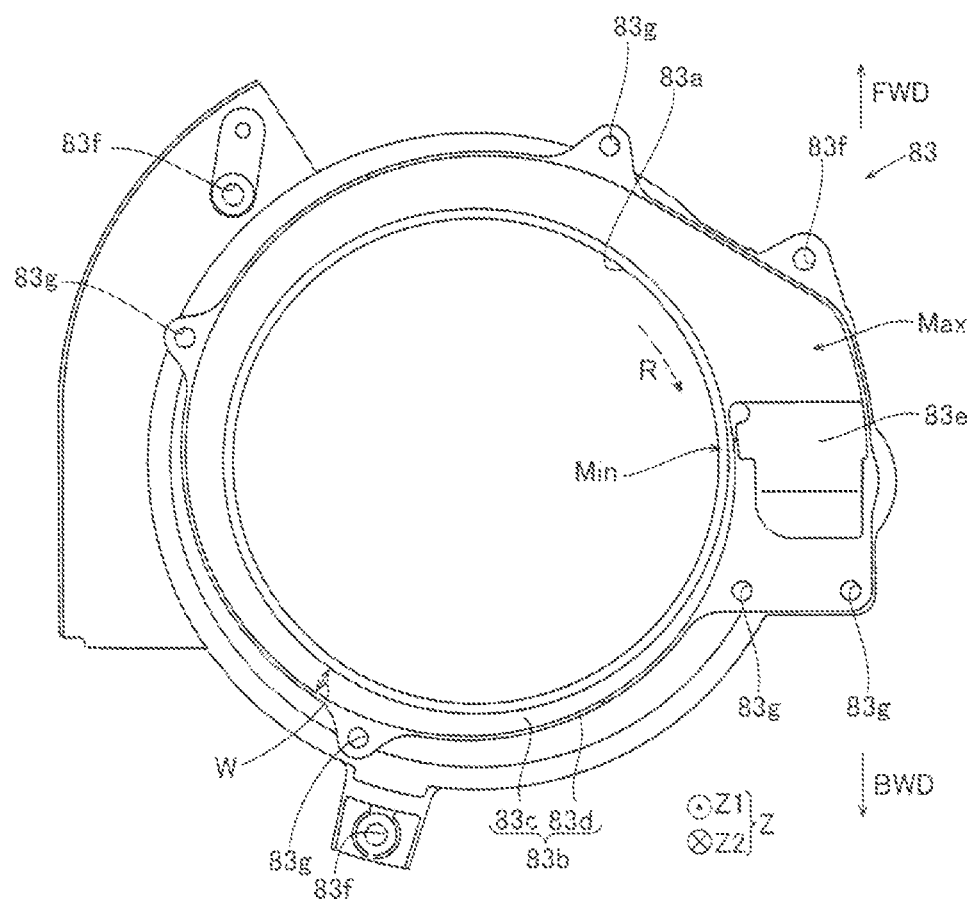
FIG. 9 is a top view showing a first air guide of a fan of an outboard motor according to a preferred embodiment of the present invention.

As shown in FIG. 9, the first air guide 83 includes an opening 83a provided at the center and an air guide 83b that surrounds the opening 83a. The fan 8 (blade 82) is disposed inside the opening 83a. Thus, the first air guide 83 surrounds the fins 82b of the blade 82 from the lateral side (radially outer side). As shown in FIGS. 4 to 6, the diameter of the opening 83a is slightly larger than the diameter of the outer periphery at an upper portion (above a position at which the ring gear 26a is provided) of the rotor 71. Thus, leakage of the wind from between the opening 83a and the rotor 71 is significantly reduced or prevented.

As shown in FIG. 9, the air guide 83b includes a floor 83c that surrounds the opening 83a and a wall 83d provided radially outward of the floor 83c and that extends upward from the floor 83c. The floor 83c is helically shaped such that its length (width W) in the radial direction from the opening 83a to the wall 83d gradually increases from a predetermined minimum position Min in the rotation direction R. In the air guide 83b, the width W of the floor 83c is the largest at a maximum position Max slightly shifted in a direction opposite to the rotation direction R with respect to the predetermined minimum position Min. As shown in FIGS. 5 and 6, the upper surface (surface on the Z1 side) of the floor 83c is disposed at the same or substantially the same height as the lower end of the blade 82.

The air guide 83b of the first air guide 83 further includes an inclined portion 83e inclined upward in the rotation direction R from the maximum position Max. The inclined portion 83e extends toward a discharge port 84e of the second air guide 84 described below. As shown in FIG. 9, the wall 83d surrounds the floor 83c and the inclined portion 83e from the radially outer side over the entire circumference thereof.

The first air guide 83 includes a plurality of fastener insertion holes 83f and a plurality of screw holes 83g. Fasteners (not shown) inserted into the fastener insertion holes 83f are screwed into screw holes (not shown) of the engine 2 such that the first air guide 83 is fixed to the engine 2.

As shown in FIGS. 5 and 6, the second air guide 84 is fixed to the upper surface of the first air guide 83. Specifically, as shown in FIG. 7, the second air guide 84 includes a plurality of fastener insertion holes 84a. Fasteners (not shown) inserted into the fastener insertion holes 84a are screwed into the screw holes 83g provided in the upper surface of the first air guide 83 such that the second air guide 84 is fixed to the first air guide 83.

As shown in FIG. 6, the second air guide 84 is disposed between the cowling inner partition 4d of the cowling 4 and the blade 82. The second air guide 84 has a lid shape that covers the blade 82 from above.

Figure 10:
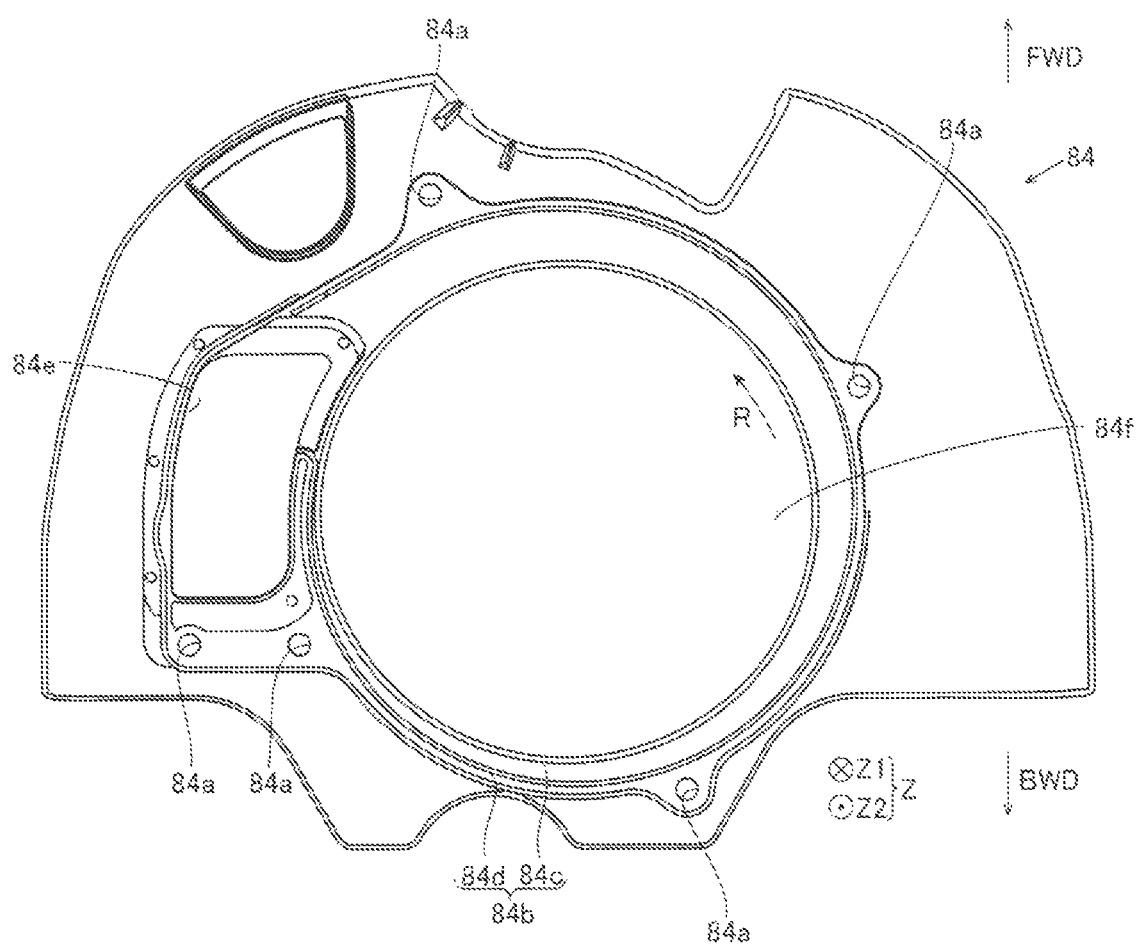
FIG. 10 is a bottom view showing a second air guide of a fan of an outboard motor according to a preferred embodiment of the present invention.

As shown in FIG. 10, the second air guide 84 includes an air guide 84b that corresponds to the air guide 83b of the first air guide 83. The air guide 84b includes a ceiling 84c helically shaped so as to gradually enlarge in the rotation direction R, similarly to the floor 83c, and a wall 84d that extends downward from the ceiling 84c and comes into contact with the wall 83d. The wall 84d surrounds the ceiling 84c and the discharge port 84e described below from the radially outer side over the entire circumference thereof. Consequently, as shown in FIGS. 5 and 6, the floor 83c and the wall 83d of the first air guide 83, and the ceiling 84c and the wall 84d of the second air guide 84, define an air guide passage P through which the wind flows laterally from the blade 82 along the outer periphery of the blade 82.

The floor 83c and the ceiling 84c are helically shaped so as to gradually enlarge in the rotation direction R, and thus the air guide passage P is helically shaped such that its width gradually increases in the rotation direction R.

As shown in FIGS. 5 and 6, the second air guide 84 includes the discharge port 84e provided at a location corresponding to the inclined portion 83e and through which the wind in the air guide passage P is discharged from the air guide passage P. An upper portion of the inclined portion 83e is inserted into the discharge port 84e. Thus, the wind in the air guide passage P is reliably guided to the discharge port 84e. The discharge port 84e is provided at a location corresponding to a discharge port 4e in the cowling inner partition 4d of the cowling 4.

Consequently, the wind (warm air) guided to the outer periphery 82d of the blade 82 by the blade 82 is guided to the air guide passage P in the rotation direction R of the blade 82. The wind guided along the outer periphery 82d through the air guide passage P is guided upward by the inclined portion 83e. Finally, the wind guided upward is discharged to the air intake chamber 4c of the cowling 4 via the discharge port 84e and the discharge port 4e. Thereafter, the wind is discharged to the outside of the outboard motor 1 (cowling 4) from a discharge port (not shown) provided in the air intake chamber 4c and isolated from the vent hole 4b.

An annular seal 85 that surrounds the discharge port 84e and the discharge port 4e is disposed between the second air guide 84 and the cowling inner partition 4d. Thus, leakage of the wind guided to the discharge port 84e to a gap between the cowling inner partition 4d and the second air guide 84 is significantly reduced or prevented such that the wind is reliably guided to the discharge port 4e. Consequently, as shown in FIG. 2, incorporation of the wind warmed by cooling the coils 72a of the stator 72 into the air inlet 6a of the air intake 6 disposed in the vicinity of the generator 7 is effectively significantly reduced or prevented. Therefore, warm air (expanded air) supplied to the engine 2 is significantly reduced or prevented, and thus the combustion efficiency of the engine 2 is improved.

A recess 84f recessed upward is provided in the second air guide 84 located immediately above the blade 82. The first plate member 82a of the blade 82 is disposed in the recess 84f. The upper surface (surface on the Z1 side) of the first plate member 82a of the blade 82 that faces the recess 84f of the second air guide 84 is flat or substantially flat.

The air guide passage P is defined by the ceiling 84c below the recess 84f of the second air guide 84. Thus, an increase in the length of the air guide passage P in a height direction is significantly reduced or prevented while the size of the blade 82 in the height direction is still sufficiently large to provide a desired wind speed. Consequently, the speed (wind speed) of the wind that flows through the air guide passage P is increased.

According to the various preferred embodiments of the present invention described above, the following advantageous effects are achieved.

According to a preferred embodiment of the present invention, the outboard motor 1 includes the fan 8 including the blade 82 disposed coaxially with the rotor 71 of the generator 7, provided separately from the rotor 71, and that rotates together with the rotation of the rotor 71. Accordingly, the blade 82 is provided separately from the rotor 71 such that the shape and material of only the blade 82 are easily changed, and thus it is easy to increase the variety of shapes of blades 82, for example. Furthermore, it is easy to remove only the blade 82 from the rotor 71 and replace the same with another blade 82, and thus it is not necessary to replace other components (such as the rotor 71) when the blade 82 is replaced. Consequently, the outboard motor 1 is provided in which it is easy to increase the variety of shapes of blades 82, for example, and it is not necessary to replace other components when the blade 82 is replaced.

According to a preferred embodiment of the present invention, the blade 82 that rotates together with the rotation of the rotor 71 is disposed coaxially with the rotor 71. Accordingly, unlike the case where the blade 82 is disposed on a different axis from the rotor 71, it is not necessary to provide a drive force generator that rotates the blade 82 in the fan 8 and provide a mechanism that transmits a rotational force of the rotor 71 to the blade 82. Consequently, blowing air with the fan 8 is achieved with a simple structure, and an increase in the size of a mechanism to blow the air is significantly reduced or prevented. Furthermore, the blade 82 is disposed coaxially with the rotor 71 of the generator 7 such that it is easy to dispose the blade 82 in the vicinity of the stator 72 of the generator 7. Thus, the coils 72a of the stator 72 are efficiently cooled by the air blown by the fan 8 (blade 82). Therefore, even when a high current is generated in the generator 7 such that the amount of heat generated in the coils 72a of the stator 72 is increased, the heat of the coils 72a of the stator 72 is efficiently released.

According to a preferred embodiment of the present invention, the blade 82 includes the annular first plate member 82a and the plurality of fins 82b that extend downward from the first plate member 82a and are integral and unitary with the first plate member 82a. Accordingly, the upwardly flowing wind generated by the plurality of fins 82b that extend downward from the first plate member 82a is at least partially guided laterally (laterally of the blade 82) by the annular first plate member 82a. Consequently, the wind is guided to the air guides (the first air guide 83 and the second air guide 84) that surround the blade 82 from the lateral side, and thus the wind is reliably guided by the air guides.

According to a preferred embodiment of the present invention, the plurality of fins 82b extend in the radial direction and are semi-arcuately curved in the planar view. Accordingly, a large amount of air is caught by the plurality of semi-arcuate fins 82b when the blade 82 rotates, and thus the amount of wind generated by the blade 82 is increased. Consequently, even when a high current is generated in the generator 7 such that the amount of heat generated in the coils 72a of the stator 72 is increased, the heat of the coils 72a of the stator 72 is more efficiently released.

According to a preferred embodiment of the present invention, the fan 8 includes the first air guide 83 including the floor 83c and the wall 83d that extends upward from the floor 83c and that surrounds the fins 82b of the blade 82. Furthermore, the upper surface of the floor 83c is disposed at the same or substantially the same height as the lower end of the blade 82. Accordingly, the height of the wall 83d from the upper surface of the floor 83c to the upper end of the wall 83d is reduced as compared with the case where the upper surface of the floor 83c is disposed below the lower end of the blade 82. Consequently, the flow passage cross-sectional area of the wind passage (air guide passage P) is easily reduced due to the wall 83d, the height of which is small, and thus the speed (wind speed) of the guided wind is increased. Therefore, the heat of the coils 72a of the stator 72 is more efficiently released due to the high speed wind.

According to a preferred embodiment of the present invention, the fan 8 includes the lid-shaped second air guide 84 that covers the first air guide 83 from above between the cowling 4 and the blade 82. Furthermore, the upper surface of the blade 82 that faces the lid-shaped second air guide 84 is flat or substantially flat. Accordingly, it is easy to dispose the second air guide 84 in the vicinity of the flat upper surface of the blade 82, and thus the flow passage cross-sectional area (the cross-sectional area in a direction perpendicular to the flow of the wind that flows through the air guide passage P) of the passage (air guide passage P) of the wind guided by the floor 83c and the wall 83d of the first air guide 83 and (the ceiling 84c and the wall 84d of) the second air guide 84 is reduced. Consequently, the wind speed in the air guide passage P is further increased, and thus the heat of the coils 72a of the stator 72 is still more efficiently released due to the wind.

According to a preferred embodiment of the present invention, the air guide passage P through which the wind flows laterally from the blade 82 along the outer periphery 82d of the blade 82 is provided at a location between the first air guide 83 and the second air guide 84, which faces the outer periphery 82d of the blade 82. Accordingly, the speed of the wind guided in the air guide passage P is increased, and thus the wind is reliably and quickly guided in the air guide passage P.

According to a preferred embodiment of the present invention, the width of the air guide passage P gradually increases in the rotation direction R of the blade 82. Accordingly, the air guide passage P is structured such that the amount of guided wind gradually increases in the rotation direction R, and thus the wind continues to be supplied from the blade 82 to the air guide passage P in the rotation direction R such that a reduction in the wind speed in the air guide passage P is reliably significantly reduced or prevented.

According to a preferred embodiment of the present invention, the first air guide 83 includes the inclined portion 83e that guides the wind upward along the outer periphery 82d through the air guide passage P. Accordingly, accumulation of the wind warmed by the coils 72a of the stator 72 in the vicinity of the stator 72 is significantly reduced or prevented due to the inclined portion 83e. Furthermore, the wind is guided to the discharge port 4e by the inclined portion 83e such that the warmed wind is reliably discharged to the outside of the outboard motor 1.

According to a preferred embodiment of the present invention, the outboard motor 1 further includes the air intake 6 including the air inlet 6a through which the air to be supplied to the engine 2 is taken in, and the cowling 4 including the engine compartment 4a in which the engine 2 is housed and into which air is supplied from the side of the engine 2 opposite to the crankshaft 24. Furthermore, the air inlet 6a, the fan 8, and the generator 7 are disposed adjacent to the side of the engine 2 on which the crankshaft 24 is provided. Accordingly, unlike the case where the air inlet 6a is disposed on the side opposite to the crankshaft 24, to which external air is supplied, suction of a large amount of air into the air inlet 6a is significantly reduced or prevented according to the structure of the present preferred embodiment of the present invention. Consequently, with this structure, a reduction in the amount of wind that flows toward the fan 8 is significantly reduced or prevented, and thus the heat of the coils 72a of the stator 72 is efficiently and reliably released.

According to a preferred embodiment of the present invention, the blade 82 is made of resin, and the rotor 71 is made of metal. Accordingly, the weight of the blade 82 is easily reduced while the mechanical strength and heat resistance of the rotor 71 are enhanced due to the rotor 71 being made of metal. Consequently, an increase in a drive force that drives the fan 8 is significantly reduced or prevented due to the blade 82 being reduced in weight.

According to a preferred embodiment of the present invention, the blade 82 includes the annular first plate member 82a, the plurality of fins 82b that extend downward from the first plate member 82a, and the annular second plate member 82c disposed on the side opposite to the first plate member 82a, which connects the plurality of fins 82b, fixed to the rotor 71. Accordingly, the fins 82b are sandwiched between the first plate member 82a and the second plate member 82c such that the rigidity of the blade 82 is improved, and thus even when the blade 82 is rotated at a high speed in order to generate a high current, occurrence of failures such as breakage in the blade 82 is prevented.

According to a preferred embodiment of the present invention, the rotor 71 is positioned so as to cover the stator 72 from above. The plurality of holes 26e that connect the lower space S1 where the stator 72 is disposed and the upper space S2 where the fan 8 is disposed are provided in a portion of the rotor 71 corresponding to the stator 72. Furthermore, the plurality of holes 26e and the plurality of fins 82b are provided at equal or substantially equal angular intervals, and the plurality of holes 26e are equal in number to the plurality of fins 82b. Accordingly, the plurality of holes 26e, which are equal in number to the plurality of fins 82b, correspond to the plurality of fins 82b, respectively, and thus wind that flows upward through the holes 26e is reliably generated by the blade 82. In addition, the plurality of holes 26e and the plurality of fins 82b are provided at equal or substantially equal angular intervals such that wind that flows upward through the holes 26e is stably generated.

The preferred embodiments of the present invention described above are illustrative in all points and not restrictive. The extent of the present invention is not defined by the above description of the preferred embodiments but by the scope of the claims, and all modifications within the meaning and range equivalent to the scope of the claims are further included.

For example, while the rotor 71 and the blade 82 preferably rotate about the rotation axis O together with the rotation of the crankshaft 24 in preferred embodiments described above, the present invention is not restricted to this. The rotor and the blade may alternatively be disposed on an axis other than the crankshaft as long as they are disposed coaxially with each other.

In preferred embodiments of the present invention, the shape of the blade is not restricted to the shape of the preferred embodiments described above. Needless to say, the shape, material (such as metal), etc. of the blade may be properly adjusted according to the shape of the outboard motor, the required amount of wind, the direction of air blowing, etc. such that the variety of blade shapes, for example, is increased. Furthermore, in preferred embodiments of the present invention, the blade is provided separately from the rotor such that the shape of only the blade is easily changed, and thus it is easy to increase the variety of blade shapes, for example.

While the fan 8 preferably includes the blade 82, the first air guide 83, and the second air guide 84 in preferred embodiments described above, the present invention is not restricted to this. The fan may alternatively include only the blade, and may not include the first air guide and the second air guide. Furthermore, the fan may alternatively include only the blade and the first air guide, and may not include the second air guide.

While the flywheel 26 preferably also defines and functions as the rotor 71 in preferred embodiments described above, the present invention is not restricted to this. A rotor provided separately from the flywheel may alternatively be attached to the crankshaft.

While the blade 82, the first air guide 83, and the second air guide 84 are preferably made of resin in preferred embodiments described above, the present invention is not restricted to this. At least one of the blade, the first air guide, and the second air guide may not be made of resin. For example, only the blade may alternatively be made of metal instead of resin.

In preferred embodiments of the present invention, the blade 82 of the fan 8 may alternatively be retrofitted to an existing outboard motor not including a fan. In this case, the blade of the fan is attached to a rotor of a generator such that it is easy to dispose the blade coaxially with the rotor.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An outboard motor comprising:
   an engine including a crankshaft;
   a generator including a rotor that rotates together with a rotation of the crankshaft and a stator in which a coil is wound so as to face the rotor; and
   a fan including a blade disposed coaxially with the rotor, provided separately from the rotor, and that rotates together with the rotation of the rotor; wherein
   the blade includes a first plate member and a plurality of fins that extend downward from the first plate member.

2. The outboard motor according to claim 1, wherein the first plate member is annular and the plurality of fins are integral and unitary with the first plate member.

3. The outboard motor according to claim 2, wherein the plurality of fins extend in a radial direction and are arcuately curved in a planar view.

4. The outboard motor according to claim 1, wherein
   the fan further includes a first air guide including a floor and a wall that extends upward from the floor and that surrounds fins provided on the blade from a lateral side; and
   an upper surface of the floor is disposed at a same or substantially a same height as a lower end of the blade.

5. The outboard motor according to claim 4, further comprising a cowling including an engine compartment in which the engine is housed; wherein
   the fan further includes a lid-shaped second air guide that covers the first air guide from above between the cowling and the blade; and
   an upper surface of the blade that faces the lid-shaped second air guide is flat or substantially flat.

6. The outboard motor according to claim 5, further comprising an air guide passage through which air flows laterally from the blade and that extends along an outer periphery of the blade at a location between the first air guide and the second air guide, and which faces the outer periphery of the blade.

7. The outboard motor according to claim 6, wherein a width of the air guide passage gradually increases in a rotation direction of the blade.

8. The outboard motor according to claim 6, wherein the first air guide includes an inclined portion that guides the air upward along the outer periphery through the air guide passage.

9. The outboard motor according to claim 1, further comprising:
   an air intake including an air inlet through which air is to be supplied to the engine; and
   a cowling including an engine compartment in which the engine is housed and into which air is supplied from a side of the engine opposite to the crankshaft; wherein
   the air inlet, the fan, and the generator are disposed adjacent to a side of the engine on which the crankshaft is located.

10. The outboard motor according to claim 1, wherein the blade is made of resin, and the rotor is made of metal.

11. The outboard motor according to claim 1, wherein the first plate member is annular, and an annular second plate member is disposed on a side opposite to the first plate member, which connects the plurality of fins, fixed to the rotor.

12. The outboard motor according to claim 2, wherein
   the rotor is positioned so as to cover the stator from above;
   a plurality of holes that communicate a lower space where the stator is disposed with an upper space where the fan is disposed are provided in a portion of the rotor corresponding to the stator;
   the plurality of holes and the plurality of fins are provided at equal or substantially equal angular intervals; and
   the plurality of holes are equal in number to the plurality of fins.

13. An outboard motor comprising:
an engine including a crankshaft;
a generator including a rotor that rotates together with a rotation of the crankshaft and a stator in which a coil is wound so as to face the rotor; and
a fan including a blade disposed coaxially with the rotor, provided separately from the rotor, and that rotates together with the rotation of the rotor; wherein
the fan further includes a first air guide including a floor and a wall that extends upward from the floor and that surrounds fins provided on the blade from a lateral side; and
an upper surface of the floor is disposed at a same or substantially a same height as a lower end of the blade.

14. An outboard motor comprising:
an engine including a crankshaft;
a generator including a rotor that rotates together with a rotation of the crankshaft and a stator in which a coil is wound so as to face the rotor;
a fan including a blade disposed coaxially with the rotor, provided separately from the rotor, and that rotates together with the rotation of the rotor;
an air intake including an air inlet through which air is to be supplied to the engine; and
a cowling including an engine compartment in which the engine is housed and into which air is supplied from a side of the engine opposite to the crankshaft; wherein
the air inlet, the fan, and the generator are disposed adjacent to a side of the engine on which the crankshaft is located.

* * * * *